No. 866,523.
PATENTED SEPT. 17, 1907.
R. SCHNEIDER.
RUBBING POST FOR LIVE STOCK.
APPLICATION FILED AUG. 29, 1906.
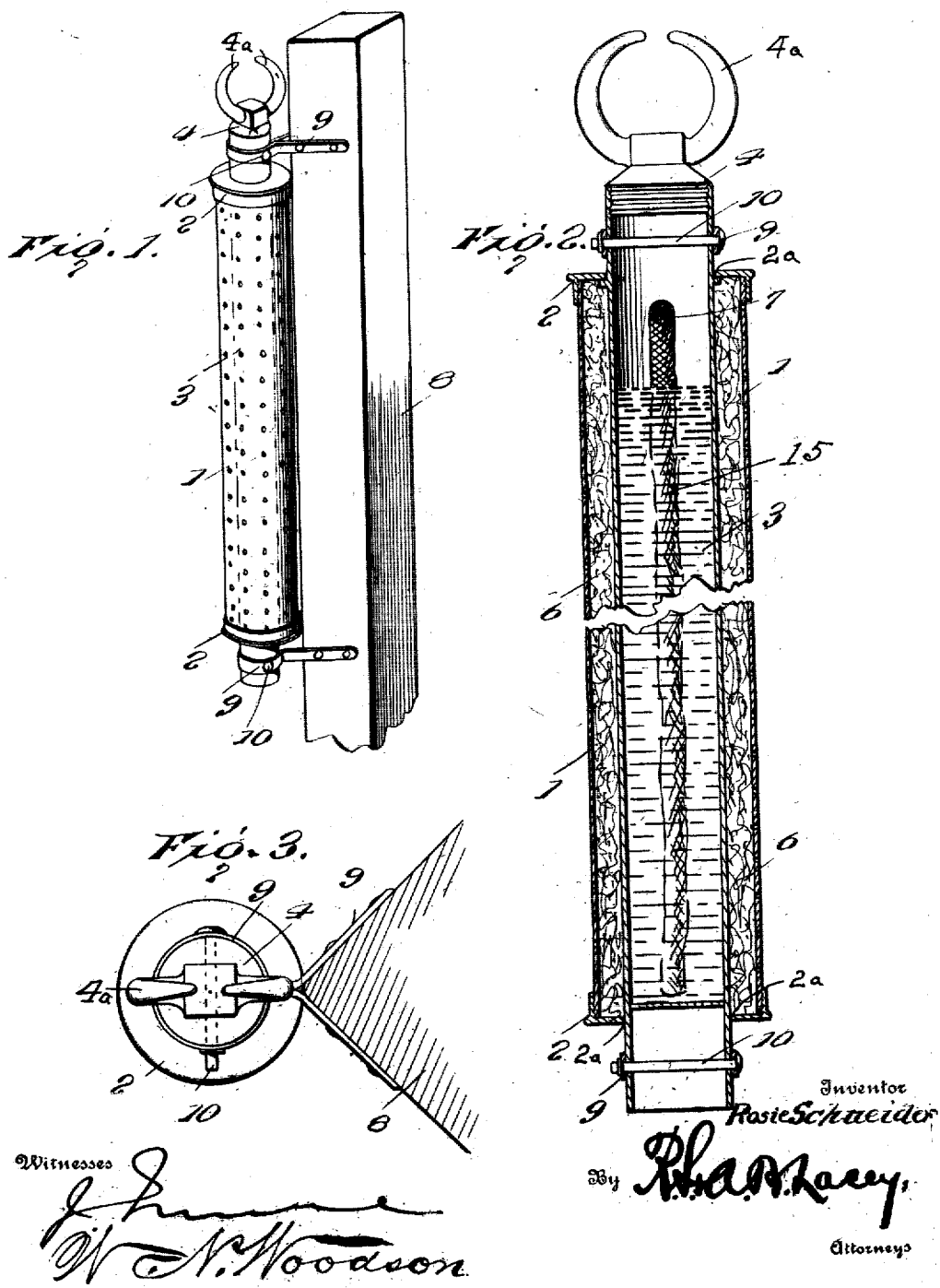

UNITED STATES PATENT OFFICE.

ROSIE SCHNEIDER, OF MINDEN, NEBRASKA.

RUBBING-POST FOR LIVE STOCK.

No. 866,523.

Specification of Letters Patent.

Patented Sept. 17, 1907.

Application filed August 29, 1906. Serial No. 332,559.

*To all whom it may concern:*

Be it known that I, ROSIE SCHNEIDER, a citizen of the United States, residing at Minden, in the county of Kearney and State of Nebraska, have invented certain new and useful Improvements in Rubbing-Posts for Live Stock, of which the following is a specification.

The object of this invention is to provide a novel means for facilitating the extermination of vermin on live stock, the invention consisting primarily of a rubbing post adapted to be secured to fences, gate posts leading to live stock yards, or in any other suitable places, convenient to the live stock to be used by the latter whenever desired.

The post comprising the invention includes a body of hollow formation, perforated to admit of egress of oil or a similar insecticide, which will be received upon the body of the animal rubbing up against the post and which will be effective as a means for exterminating or destroying vermin with which such animal may happen to be afflicted.

For a full description of the invention and the merits thereof and also to acquire a knowledge of the details of construction of the means for effecting the result, reference is to be had to the following description and accompanying drawings, in which:

Figure 1 is a perspective view showing the practical embodiment of the invention. Fig. 2 is a vertical sectional view. Fig. 3 is a top plan view.

Corresponding and like parts are referred to in the following description and indicated in all the views of the drawings by the same reference characters.

Specifically describing the invention, the numeral 1 designates the hollow body of the post, which is preferably of somewhat circular form in cross section, and which is provided at opposite ends with caps 2. The body 1 is apertured at intervals throughout its length, and passing through the body is an oil reservoir 3 which consists preferably of a tube, the lower end of which is closed permanently and the upper end of which is closed by means of a removable plug 4. The plug 4 may be of any suitable form admitting of ready removal and is screwed into the upper extremity of the tube or reservoir 3, preferably. Handles or horns 4ª are integrally formed with the plug 4 to facilitate its ready removal whenever desired. The reservoir 3 passes through openings 2ª formed in the caps 2 of the body 1 of the post, and in the space between the reservoir 3 and the body 1 is arranged absorbent, porous or similar material, such as cotton or the like, indicated at 6. Near the upper end portion of the reservoir 3, and within the body 1 of the post, the reservoir 3 is provided with oil openings 7 at opposite sides, the oil or contents of the reservoir 3 being adapted to escape therefrom through said openings 7. The liquid contents of the reservoir 3 are caused to pass therefrom to the absorbent material 6 filling the reservoir until it overflows through openings 7, the overflowing oil being absorbed by the material 6.

If found desirable, a wick 15 communicating with the packing 6 may extend through the opening 7 and pass into the oil contained within the reservoir 3. With this construction, it will be readily understood that owing to the action of capillary attraction, the packing 6 would always remain saturated with the oil or other liquid insecticide contained in the tank.

In the preferred use of the invention, a rubbing post, such as hereinbefore described, is attached to a suitable supporting post 8 and the latter may constitute a gate post, a fence post, or may be a separate and independent post specially placed in the ground as a means for the rubbing post hereinbefore described. Brackets 9 will be attached to the supporting post 8 and said brackets will embrace the opposite extremities of the reservoir 3, said extremities projecting a short distance above and below the top and bottom, respectively of the body 1 of the rubbing post. Transverse bolts or fastenings 10 pass through the brackets 9. The opposite extremities of the reservoir effectively secure the reservoir to the body of the post 1 and the supporting means indicated at 8.

In the actual use of the invention, it will be obvious that when the live stock brushes or rubs against the post 1, oil will be applied to the body of the animal or animals and this oil will be of a constituency specially designed to exterminate vermin on the animal. Whenever it is necessary to refill the reservoir 3, the plug 4 will be removed and this operation performed.

Having thus described the invention, what is claimed as new is:

1. A rubbing post for live stock consisting of an outer apertured hollow body, a reservoir arranged within said hollow body and adapted to contain oil, said reservoir having a suitable outlet leading to the space between the hollow body and the reservoir, and absorbent material packed in the space between the hollow body and the reservoir, for the purpose specified.

2. A rubbing post for live stock consisting of an apertured hollow or tubular body, a reservoir having an oil outlet and arranged in said body and adapted to contain a vermin exterminator, absorbent material between the reservoir and the hollow body of the post, the opposite ends of the reservoir extending from opposite ends of the hollow body of the post, and means connected with said extending ends of the reservoir to secure the post to a suitable support.

3. A rubbing post for live stock consisting of a hollow or tubular apertured body, a reservoir passing through the body and the opposite ends thereof, absorbent material between the reservoir and the hollow body, a plug closing one end of the reservoir, and brackets secured to the extending end portions of the reservoir and adapted to be secured to a suitable support, the reservoir having an oil outlet.

In testimony whereof I affix my signature in presence of two witnesses.

ROSIE SCHNEIDER. [L. S.]

Witnesses:
 C. P. ANDERBERY,
 REYE IRWIN.